(12) United States Patent
Penkov (10) Patent No.: US 10,093,366 B2
(45) Date of Patent: Oct. 9, 2018

(54) QUICK RELEASE FIFTH WHEEL MOUNTING BRACKET

(71) Applicant: Nikolay Y. Penkov, Arden, NC (US)

(72) Inventor: Nikolay Y. Penkov, Arden, NC (US)

(*) Notice: Subject to any disclaimer, the term of this patent is extended or adjusted under 35 U.S.C. 154(b) by 171 days.

(21) Appl. No.: 15/276,116

(22) Filed: Sep. 26, 2016

(65) Prior Publication Data
US 2017/0088203 A1   Mar. 30, 2017

Related U.S. Application Data

(60) Provisional application No. 62/222,949, filed on Sep. 24, 2015.

(51) Int. Cl.
*B62D 53/08* (2006.01)
(52) U.S. Cl.
CPC .................... *B62D 53/08* (2013.01)
(58) Field of Classification Search
CPC ...................................... B62D 53/08
USPC ........................................ 280/433
See application file for complete search history.

(56) References Cited

U.S. PATENT DOCUMENTS

| 5,509,682 A * | 4/1996 | Linderman ........ B62D 53/0828 280/438.1 |
| 6,182,996 B1 * | 2/2001 | Koetter .................. B62D 53/08 280/433 |
| 2003/0019643 A1 * | 1/2003 | Pyle ..................... A01B 59/043 172/439 |

* cited by examiner

*Primary Examiner* — Tony H Winner
*Assistant Examiner* — Felicia L. Brittman
(74) *Attorney, Agent, or Firm* — The Van Winkle Law Firm; William G. Heedy; David M. Carter (57) ABSTRACT

A fifth wheel mounting bracket apparatus for use in combination with a fifth wheel and corresponding pin includes a main body having a mounting base and opposing upward rising surface members extending therefrom at an angle between 30-degrees and 60-degrees, the opposing upward rising surface members each having distal and proximal ends; first and second jaw members each being secured to the proximal end of a respective one of the opposing upward rising surface members; the first and second jaw members defining a bore that is sized and configured for engaged receipt of the fifth wheel pin therethrough; and wherein the first and second jaw members are configured to bend at the proximal end of the respective one of the opposing upward rising surface members in order to release the fifth wheel and corresponding pin when a force equal to a predetermined value is exerted on the jaw members.

12 Claims, 7 Drawing Sheets

QUICK RELEASE FIFTH WHEEL MOUNTING BRACKET

This application claims priority to and incorporates entirely by reference U.S. Provisional Patent Application Ser. No. 62/222,949 filed on Sep. 24, 2015.

BACKGROUND OF THE INVENTION

Field of the Invention

This invention relates to an apparatus for coupling a vehicle with a trailer and, more particularly, to a fifth wheel mounting bracket apparatus for uncoupling the vehicle and trailer when actuated.

Background of the Related Art

To draw a trailer with a car, truck or other traction engine, a trailer hitch, fifth wheel coupling or other type of tow hitch is needed for linking the trailer and the vehicle. Standard bumper hitch trailers typically allow a ten to fifteen percent hitch load while a fifth wheel can typically handle twenty or twenty-five percent weight transfer and are typically utilized for loads in excess of 10,000 pounds. A fifth wheel coupling uses a horseshoe-shaped coupling device mounted to the rear of the towing vehicle and is intended for level roads and limited side to side tilt. A problem arises wherein outside forces may cause the trailer weight to shift such that the towing vehicle coupled thereto is lifted and possibly rolled over, which can cause damage to the towing vehicle as well as injury to the driver of the towing vehicle and/or passenger(s) therein.

In view of the problems associated with presently available fifth wheel couplings, as discussed above, there is a need for a fifth wheel mounting bracket that prevents the towing vehicle from being lifted and/or rolled over in response to the coupled trailer tilting too much and possibly rolling over.

SUMMARY OF THE INVENTION

In accordance with one form of the present invention, there is provided a fifth wheel mounting bracket apparatus for use in combination with a fifth wheel and corresponding pin, the mounting bracket apparatus including a main body having a mounting base and opposing upward rising surface members extending therefrom at an angle between 30-degrees and 60-degrees, the opposing upward rising surface members each having a distal end and a proximal end; first and second jaw members each being secured to the proximal end of a respective one of the opposing upward rising surface members; the first and second jaw members defining a bore that is sized and configured for engaged receipt of the fifth wheel pin therethrough; and wherein each of the first and second jaw members are sized and configured to bend at the proximal end of the respective one of the opposing upward rising surface members in order to release the fifth wheel and corresponding pin when a force equal to a predetermined value is exerted on the jaw members.

In accordance with another form of the present invention, there is provided a fifth wheel mounting bracket apparatus for use in combination with a fifth wheel and corresponding pin, the mounting bracket apparatus including a main body having a mounting base and opposing upward rising surface members extending therefrom at an angle between 30-degrees and 60-degrees, the opposing upward rising surface members each having a distal end and a proximal end; an incomplete ring member secured to the proximal ends of each of the opposing upward rising surface members, and the incomplete ring member defining first and second jaw members; the first and second jaw members defining a bore that is sized and configured for engaged receipt of the fifth wheel pin therethrough; and wherein each of the first and second jaw members are sized and configured to bend at the proximal end of the respective one of the opposing upward rising surface members in order to release the fifth wheel and corresponding pin when a force equal to a predetermined value is exerted on the jaw members.

In accordance with another form of the present invention, there is provided a fifth wheel mounting bracket apparatus for use in combination with a fifth wheel and corresponding pin, the mounting bracket apparatus including a main body having a mounting base and opposing upward rising surface members extending therefrom at an angle between 30-degrees and 60-degrees, the opposing upward rising surface members each having a distal end and a proximal end; an incomplete ring member secured to the proximal ends of each of the opposing upward rising surface members, and the incomplete ring member defining first and second jaw members; the first and second jaw members defining a bore that is sized and configured for engaged receipt of the fifth wheel pin therethrough; and wherein each of the first and second jaw members have a thickness (d) selected for permitting the first and second jaw members to bend at the proximal end of the respective one of the opposing upward rising surface members in order to release the fifth wheel and corresponding pin when a force (F) acts on the first and second jaw members, wherein d is defined by the equation:

$$d = \left(\frac{4Fl^3}{bE\delta}\right)^{1/3}$$

wherein l is the length of the bending part of the bracket, b is the width of the bracket, E is the modulus of elasticity, and δ is the deflection.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the quick release fifth wheel mounting bracket apparatus of the present invention for use in combination with a fifth wheel 100 and a vehicle frame 102 is shown and is generally indicated as 10.

Generally, a fifth wheel mounting bracket is mounted to a vehicle frame and is provided for supporting a fifth wheel in a manner that permits pivoting in the horizontal plane to permit relative turning of the vehicle and trailer. The opposing mounting brackets each include a bore being adapted to receive ends of pins passing through transversely. Alternatively, fifth wheel mounting brackets may be mounted to a trailer slide.

Figure 1:
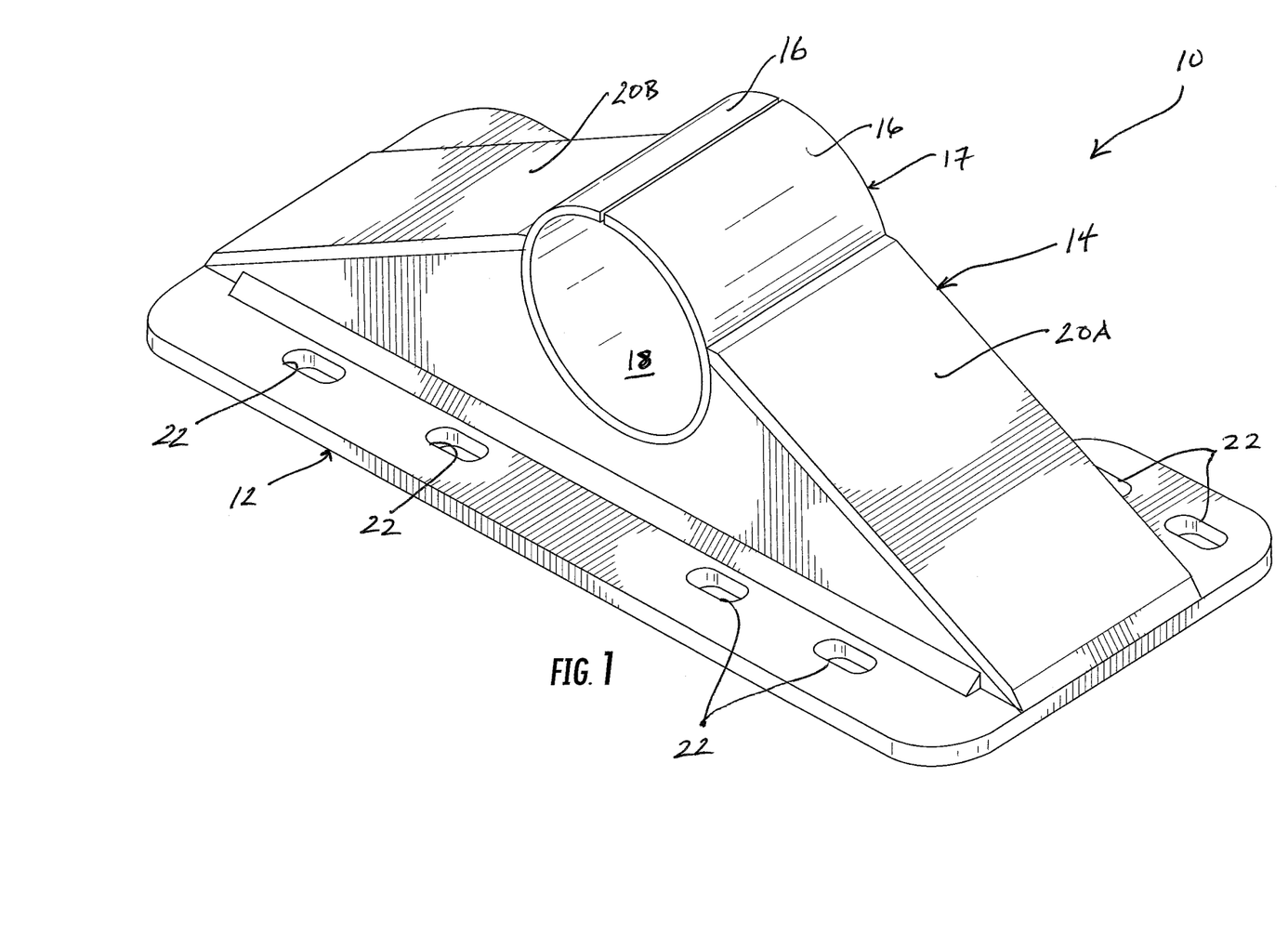
FIG. 1 is a perspective view of the quick release fifth wheel mounting bracket apparatus of the present invention, wherein the mounting bracket apparatus is in the closed position.
Figure 2:
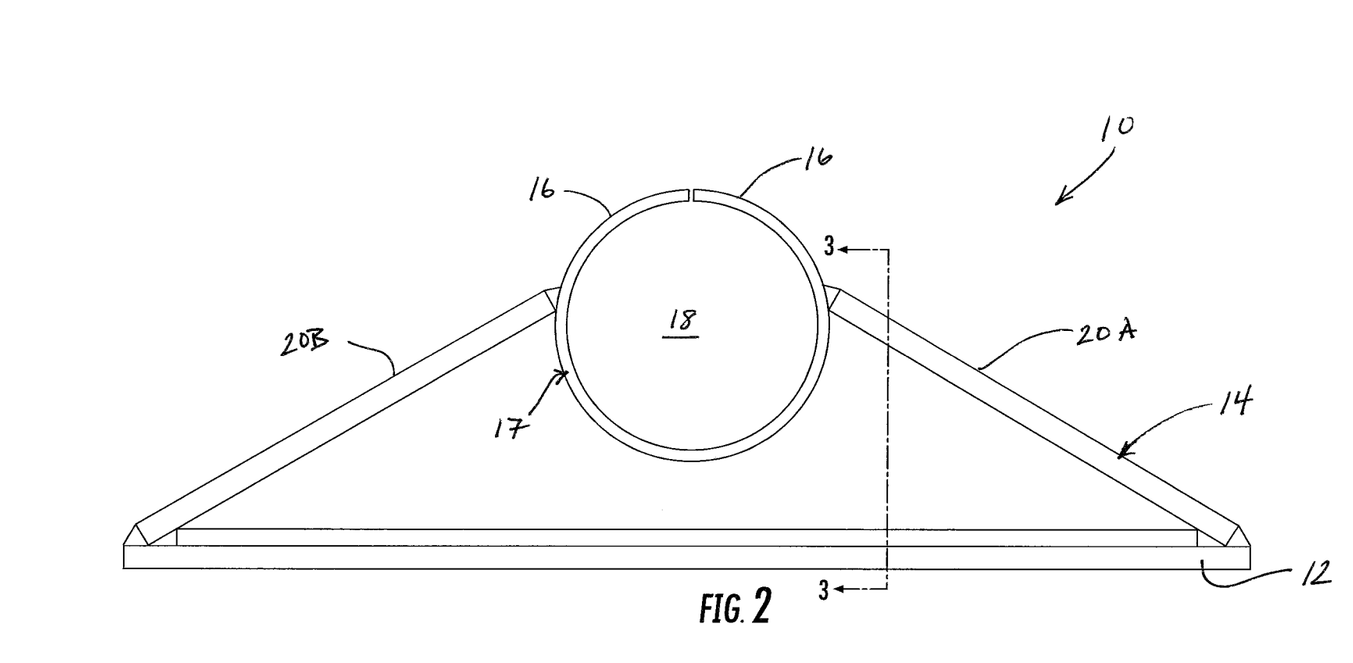
FIG. 2 is a side elevational view of the quick release fifth wheel mounting bracket apparatus of the present invention, wherein the mounting bracket apparatus is in the closed position.
Figure 3:
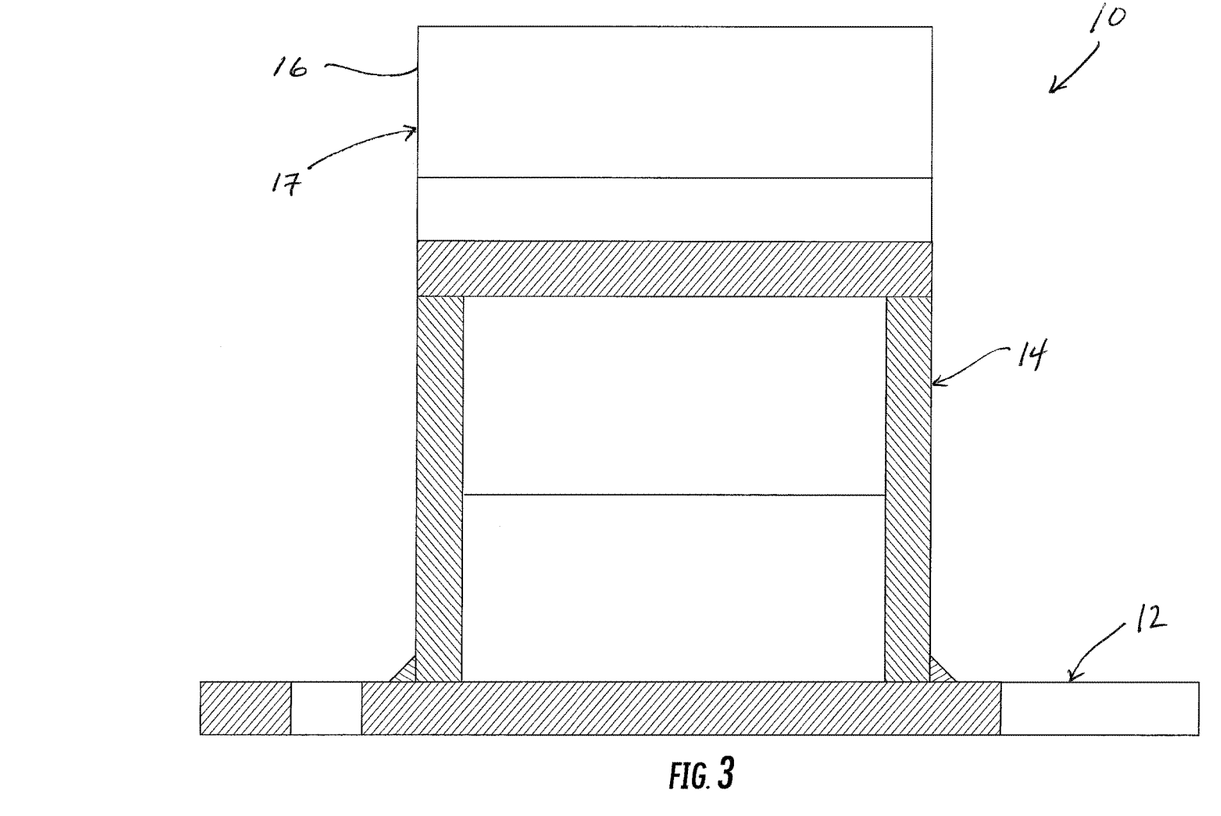
FIG. 3 is a side elevational view of the quick release fifth wheel mounting bracket apparatus of the present invention, shown in cross-section, taken from line 3-3 in FIG. 2.
Figure 4:
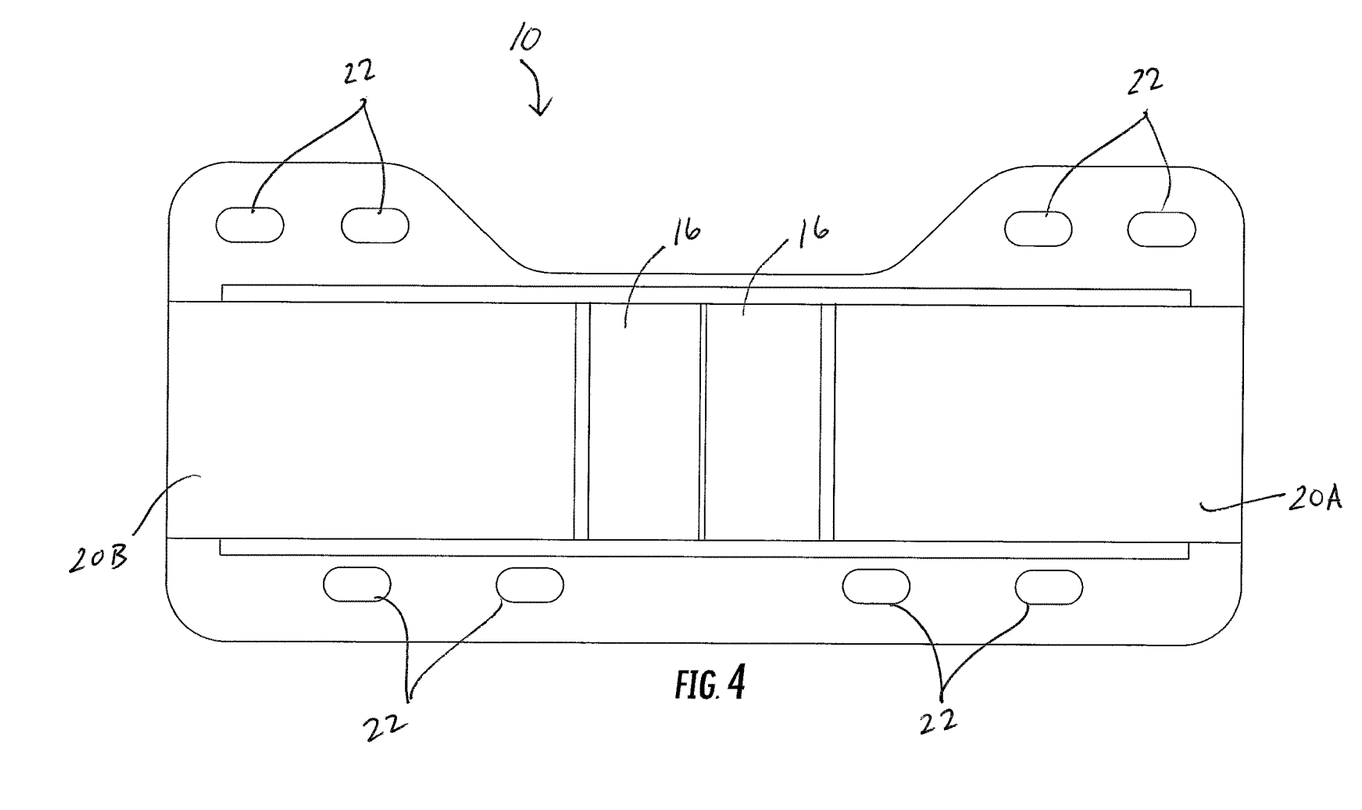
FIG. 4 is a top planar view of the quick release fifth wheel mounting bracket apparatus of the present invention, wherein the mounting bracket apparatus is in the closed position.

Referring initially to FIGS. 1-4, the quick release fifth wheel mounting bracket apparatus 10 is shown and includes a mounting base 12, a main body 14 and jaw members 16 that are sized and configured to form a cylindrical portion defining a bore 18. In an exemplary embodiment, as shown throughout the drawings, jaw members 16 are formed from an incomplete ring member 17. The main body 14 is structured to support the weight of a trailer and is mounted to a vehicle frame or trailer slide at mounting base 12. In a preferred embodiment, the main body 14 is configured in a generally triangular shape, including opposing upward rising surfaces 20A and 20B, whereby the center of bore 18 is laterally located at the midpoint of the main body 14 and vertically located above to the proximal ends of the opposing upward rising surfaces 20A and 20B. Jaw members 16 are configured for operation between a closed position, as shown in FIG. 1, and an open position, as described below and shown in FIG. 6B.

In one embodiment, a bushing (not shown) is sized and configured for placement in bore 18 in order to reduce friction between the pin and mounting bracket apparatuses 10. It should be noted that the pin in contact with bushing is different from the kingpin, which is connected to the fifth wheel itself.

Figure 5:
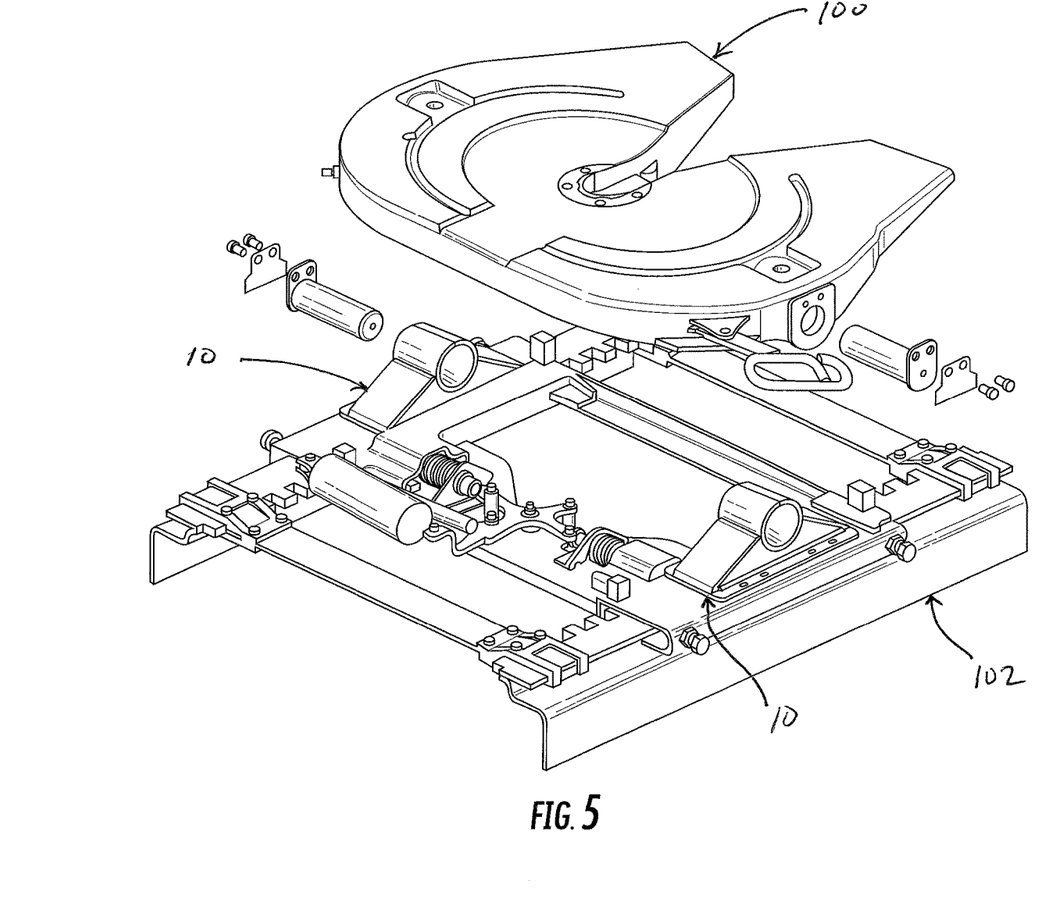
FIG. 5 is a partially exploded perspective view illustrating a fifth wheel and opposing first and second quick release fifth wheel mounting bracket apparatuses.

Referring specifically to FIG. 1, one or more apertures 22 are provided on the mounting base 12 for use in combination with bolts (not shown) for securing the apparatus 10 to a vehicle frame 102 (see FIG. 5). Other suitable means of securing the apparatus 10 to the vehicle frame 102 may be used as well.

Referring to FIG. 5, a fifth wheel 100 and vehicle frame 102 are shown with opposing first and second quick release fifth wheel mounting bracket apparatuses 10 secured thereto. It can be understood that the mounting bracket apparatus 10 can be used in combination with an adjustable slide member, as shown in FIG. 5, as well as a stationary support.

Figure 6A:
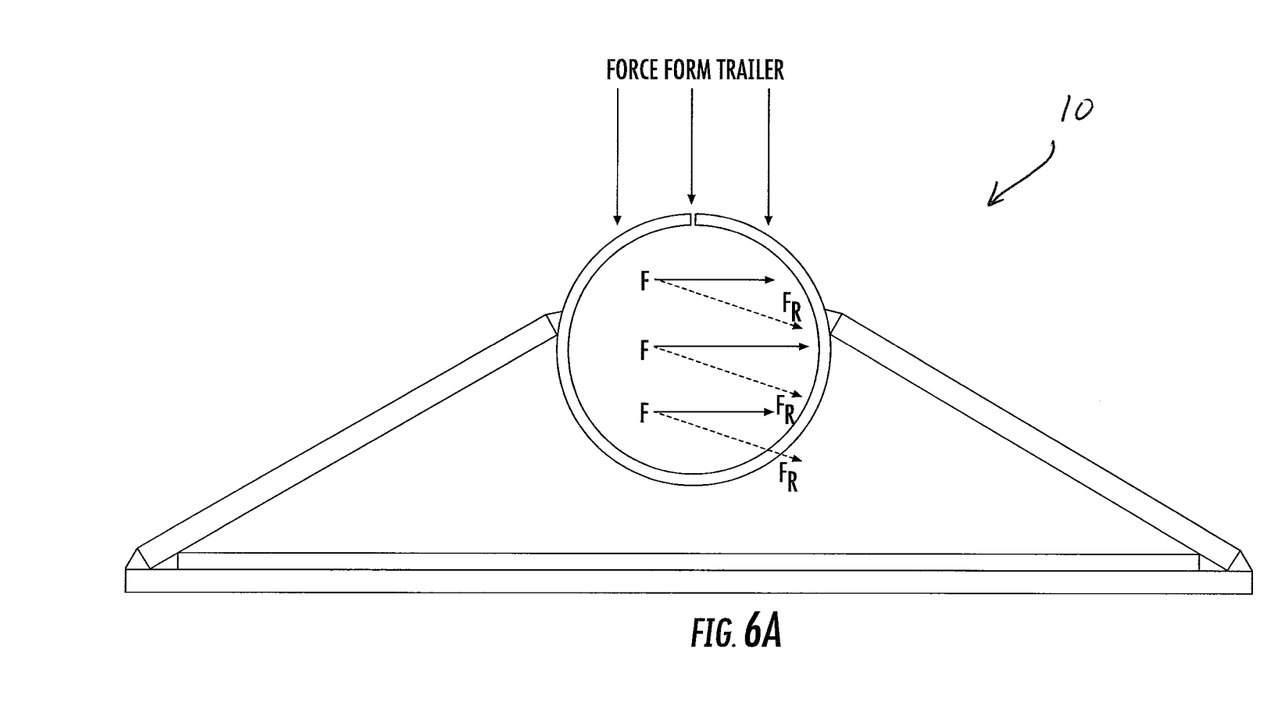
FIG. 6A is a side elevational view of the quick release fifth wheel mounting bracket apparatus of the present invention and illustrating the forces being exerted thereon.

In operation, jaw members 16 are structured and disposed to bend outwards such that the opposing jaw members 16 separate and thereby free the pin when a sufficient resulting force FR (see FIG. 6A) is exerted on the mounting bracket apparatus 10, thereby allowing the fifth wheel 100 to disconnect and separating the vehicle from the trailer such that it will remain in an upright position.

Figure 6B:
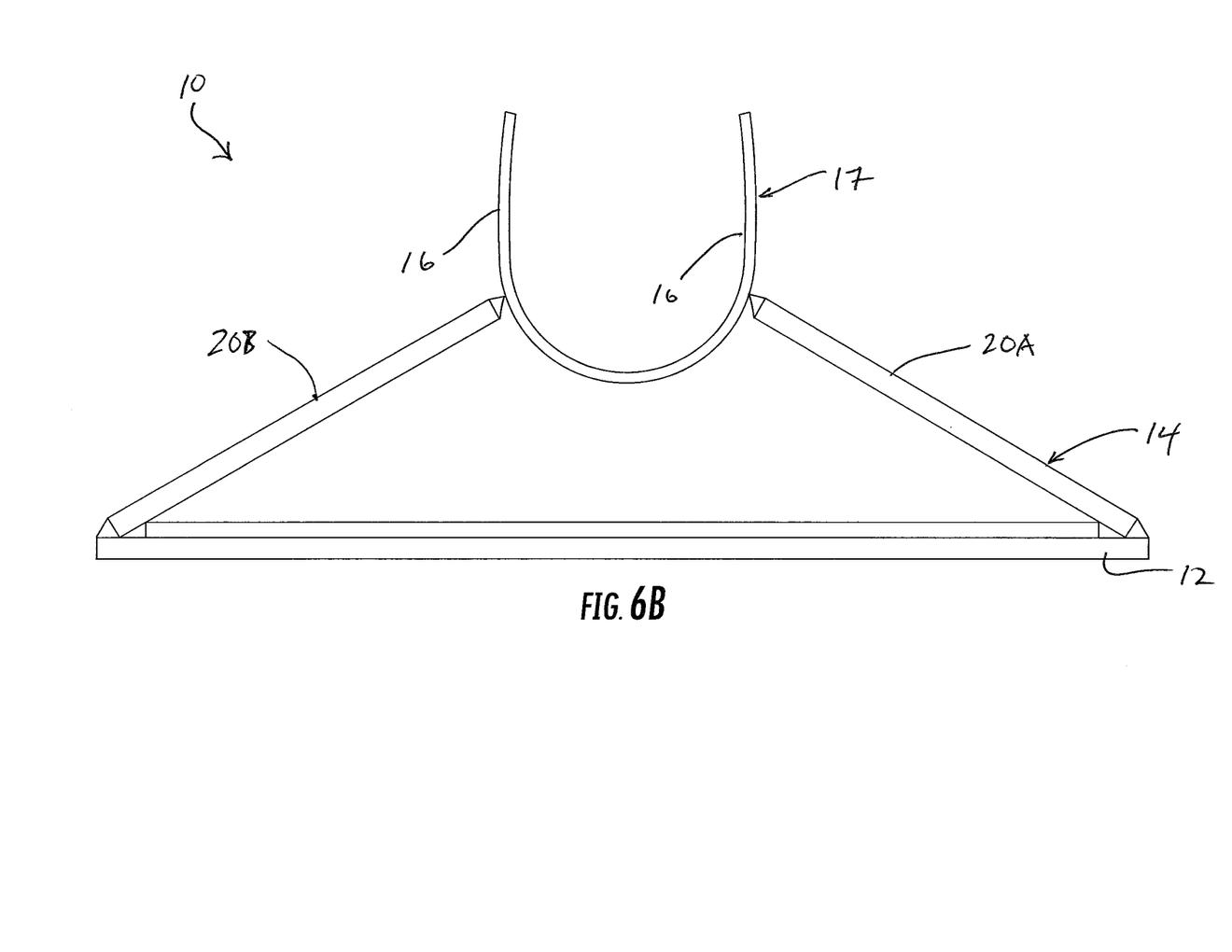
FIG. 6B is a side elevational view of the quick release fifth wheel mounting bracket apparatus of the present invention, wherein the mounting bracket apparatus is in the open position.

The thickness of the materials forming the jaw members 16 is such that the FR required to bend (see FIG. 6B) and therefore separate the jaw members 16 is approximately equal to the force required to initiate rollover of the vehicle is exerted on the jaw members 16. Specifically, the thickness of the material is selected using the equation, $$d = \left(\frac{4Fl^3}{bE\delta}\right)^{1/3}$$

d—thickness of material
F—force acting on the bracket
l—length of the bending part of the bracket
b—width of the bracket
E—modulus of elasticity
δ—deflection.

To prevent the bracket from the accidental disconnect during normal towing operation, the jaw members 16 are attached to the main body 14 in such a way that the opposing upward rising surfaces 20A and 20B are secured to respective jaw members 16 above the center line, thereby allowing the forces to be transferred to the opposing upward rising surfaces 20A and 20B below the bend line. The resulting force FR results from the longitudinal forces F (result of pulling the trailer) and the vertical downward forces (force from the trailer), and therefore will always have a negative γ-component. This ensures that the forces are properly transferred to the opposing upward rising surfaces 20A and 20B of the main body 14.

While the present invention has been shown and described in accordance with several preferred and practical embodiments, it is recognized that departures from the instant disclosure are contemplated within the spirit and scope of the present invention.

What is claimed is:

1. A fifth wheel mounting bracket apparatus for use in combination with a fifth wheel and corresponding pin, said mounting bracket apparatus comprising:
    a main body including a mounting base and opposing upward rising surface members extending therefrom at an angle between 30-degrees and 60-degrees, said opposing upward rising surface members each having a distal end and a proximal end;
    first and second jaw members each being secured to the proximal end of a respective one of said opposing upward rising surface members;
    said first and second jaw members defining a bore that is sized and configured for engaged receipt of the fifth wheel pin therethrough; and
    wherein each of said first and second jaw members are sized and configured to bend at the proximal end of the respective one of said opposing upward rising surface members in order to release the fifth wheel and corresponding pin when a force equal to a predetermined value is exerted on the jaw members.

2. The mounting bracket apparatus as recited in claim 1 further comprising a bushing that is sized and configured for placement in said bore, and said bushing surrounding a passage for engaged receipt of the fifth wheel pin therethrough.

3. The mounting bracket apparatus as recited in claim 1 further comprising a plurality of apertures for use in combination with bolts for securing said mounting bracket apparatus to a vehicle frame.

4. The mounting bracket apparatus as recited in claim 3 wherein said plurality of apertures are on said mounting base.

5. A fifth wheel mounting bracket apparatus for use in combination with a fifth wheel and corresponding pin, said mounting bracket apparatus comprising:
- a main body including a mounting base and opposing upward rising surface members extending therefrom at an angle between 30-degrees and 60-degrees, said opposing upward rising surface members each having a distal end and a proximal end;
- an incomplete ring member secured to the proximal ends of each of said opposing upward rising surface members, and said incomplete ring member defining first and second jaw members;
- said first and second jaw members defining a bore that is sized and configured for engaged receipt of the fifth wheel pin therethrough; and
- wherein each of said first and second jaw members are sized and configured to bend at the proximal end of the respective one of said opposing upward rising surface members in order to release the fifth wheel and corresponding pin when a force equal to a predetermined value is exerted on the jaw members.

6. The mounting bracket apparatus as recited in claim 5 further comprising a bushing that is sized and configured for placement in said bore, and said bushing surrounding a passage for engaged receipt of the fifth wheel pin therethrough.

7. The mounting bracket apparatus as recited in claim 5 further comprising a plurality of apertures for use in combination with bolts for securing said mounting bracket apparatus to a vehicle frame.

8. The mounting bracket apparatus as recited in claim 7 wherein said plurality of apertures are on said mounting base.

9. A fifth wheel mounting bracket apparatus for use in combination with a fifth wheel and corresponding pin, said mounting bracket apparatus comprising:
- a main body including a mounting base and opposing upward rising surface members extending therefrom at an angle between 30-degrees and 60-degrees, said opposing upward rising surface members each having a distal end and a proximal end;
- an incomplete ring member secured to the proximal ends of each of said opposing upward rising surface members, and said incomplete ring member defining first and second jaw members;
- said first and second jaw members defining a bore that is sized and configured for engaged receipt of the fifth wheel pin therethrough; and
- wherein each of said first and second jaw members have a thickness (d) selected for permitting said first and second jaw members to bend at the proximal end of the respective one of said opposing upward rising surface members in order to release the fifth wheel and corresponding pin when a force (F) acts on said first and second jaw members, wherein d is defined by the equation:

$$d = \left(\frac{4Fl^3}{bE\delta}\right)^{1/3}$$

wherein l is a length of a bending part of the bracket apparatus, b is a width of the bracket apparatus, E is a modulus of elasticity, and δ is a deflection.

10. The mounting bracket apparatus as recited in claim 9 further comprising a bushing that is sized and configured for placement in said bore, and said bushing surrounding a passage for engaged receipt of the fifth wheel pin therethrough.

11. The mounting bracket apparatus as recited in claim 9 further comprising a plurality of apertures for use in combination with bolts for securing said mounting bracket apparatus to a vehicle frame.

12. The mounting bracket apparatus as recited in claim 11 wherein said plurality of apertures are on said mounting base.

* * * * *